United States Patent [19]
Easwar et al.

[11] Patent Number: 5,933,588
[45] Date of Patent: Aug. 3, 1999

[54] PATTERN FILLING FOR PROCESSOR-BASED PRINTER

[75] Inventors: Venkat V. Easwar, Campbell, Calif.; Gouresh Govind Kamat, Mardol Goa; Praveen K. Ganapathy, Karnataka, both of India

[73] Assignee: Texas Instruments Incorporated, Dallas, Tex.

[21] Appl. No.: 08/951,021

[22] Filed: Oct. 15, 1997

[51] Int. Cl.$^6$ .................................................. G06K 15/00
[52] U.S. Cl. ................................... 395/116; 395/117
[58] Field of Search ................................ 395/101, 109, 395/117, 114, 115–116; 382/175, 176, 177, 236, 239; 358/462, 470, 431; 345/202, 203, 113, 114, 116, 118, 25, 435, 431, 509, 515, 191, 194

[56] References Cited

U.S. PATENT DOCUMENTS 5,321,810  6/1994  Case et al. ............................. 395/166
5,333,246  7/1994  Nagasaka ............................... 395/133
5,469,536  11/1995  Blank ..................................... 395/131

*Primary Examiner*—Arthur G. Evans
*Attorney, Agent, or Firm*—Charles A. Brill; Frederick J. Telecky, Jr.; Richard L. Donaldson

[57] ABSTRACT

A method of writing a pattern filled character (FIG. 3) or graphics object from internal memory of a processor (11) to bitmap memory (13a), in a manner that minimizes the amount of data required to be read. The pattern mask is replicated to cover the character mask (FIGS. 5A–5C). The masks are combined to obtain a composite mask, whose values are then expanded to a pattern color value if the corresponding pixel is to be printed or to a transparency value if the corresponding pixel is not to be written. (FIG. 4) A transparency write process is used such that only those values that do not match the transparency value are written (FIG. 6). The method can be modified for colored and uncolored pattern fills of both characters and graphics objects.

19 Claims, 4 Drawing Sheets

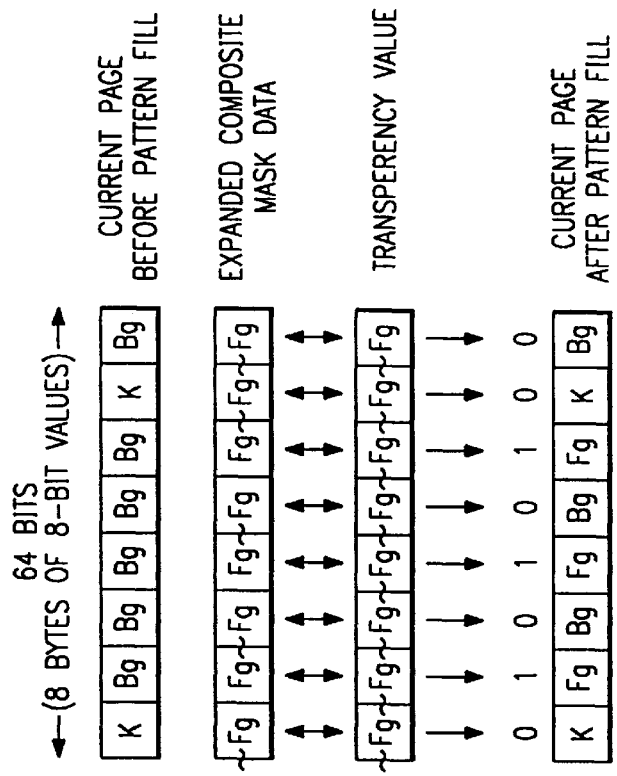
FIG. 6
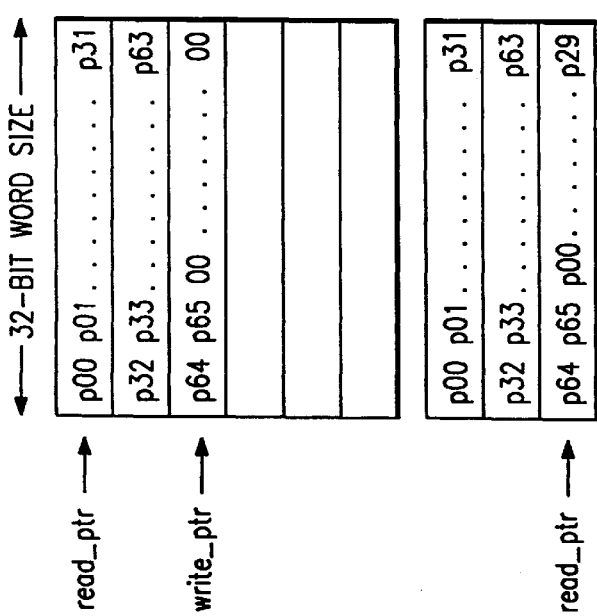
FIG. 5A
FIG. 5b
FIG. 5c

5,933,588

PATTERN FILLING FOR PROCESSOR-BASED PRINTER

RELATED PATENT APPLICATIONS

This patent application is related to the following patent applications, each assigned to Texas Instruments Incorporated:

U.S. patent application Ser. No. 08/902,709 (Atty Dkt No. TI-19972), entitled "Embedded Display List Interpreter for Multiprocessor-Based Printer"; U.S. patent application Ser. No. 08/411,871 (Atty Dkt No. TI-21872), entitled "Screening Method for a Single Chip Multiprocessor"; U.S. patent application Ser. No. 08/900,896 (Atty Dkt No. TI-22009), entitled "Managing Interpreter Cofunctions on Multiprocessor-Based Printer"; and U.S. patent application Ser. No. 08/956,402 (Atty Dkt No. TI-23781), entitled "Reduced Instruction Processing on a Multiprocessor".

TECHNICAL FIELD OF THE INVENTION

This invention relates generally to processor-based printing systems, and more particularly to a method of rendering an image with a pattern filled character or graphical object.

BACKGROUND OF THE INVENTION

Modern electrophotographic printers typically use some sort of processor to interpret a program representing the image to be printed. The program is written in some sort of graphical description language. The interpretation usually involves conversion of the program into an intermediate format, such as a display list. This display list is subsequently used to create a bitmap, which determines a pattern of light that will expose a photosensitive drum. The exposure of the drum results in a charge pattern on the drum. The drum rotates past a toner dispenser and attracts toner particles to the drum's surface corresponding to the charge pattern. The drum transfers the toner to a print medium such as a piece of paper. The toner is fused to the paper, usually with heat, and the paper exits the printer.

The exposure unit that provides the pattern of light for exposing the drum can be comprised of a laser-scanning device or a spatial light modulator. Spatial light modulators are becoming the technology of choice for full color, high resolution printing at increasingly faster speeds.

As printer hardware improves, methods for providing faster image data processing are also needed. The number of pages printed per minute is highly dependent on the performance of the RIP (raster image processor).

SUMMARY OF THE INVENTION

One aspect of the invention is a method of writing pattern fill values to a bit map memory, for printing a character represented by a character mask that is to be filled with a pattern represented by a pattern mask. The pattern mask is replicated to cover the character mask. If necessary, the replicated pattern mask is then aligned to the character mask so that they occupy the same location on the page. The replicated and aligned pattern mask is combined with the character mask, thereby providing a composite mask. The composite mask is then expanded, such that mask values representing pixels to be printed are replaced with color values and mask values representing pixels not to be printed are replaced with a transparency value. A "transparency write" is used to compare values of the expanded composite mask to a stored value equal to the transparency value. Only values of the expanded composite mask that do not match the stored transparency value are written to the bit map memory.

An advantage of the invention is a reduction in the amount of data required to be transferred to the processor's internal memory from external memory. Specifically, there is no need to read a source region of the current page from the frame buffer (bitmap memory). This improves processor performance in two ways. First, wait time involved in transferring the data is reduced. Second, the work load of the input/output resources of the processor is reduced.

BRIEF DESCRIPTION OF THE DRAWINGS

FIGS. 5A–5C illustrate replication of the pattern mask in a memory space using read and write pointers.

FIG. 6 illustrates a transparency write.

DETAILED DESCRIPTION OF THE INVENTION

For purpose of example, the following description is in terms of printer systems that use a spatial light modulator (SLM) to expose a photosensitive drum. The specific SLM device is a digital micro-mirror device (DMD). However, the same concepts could apply to printer systems that use other types of exposure systems, such as scanned laser exposure systems, and that use other types of transfer modes. In general, the invention is useful for any printer system that uses a processor to interpret a page description language, whose print operators include pattern fills.

One aspect of the invention is a method of pattern filling graphics objects or bit-mapped characters. Typically, these graphics objects and characters are described by page description programming, such as a programming in the POSTSCRIPT language. This assumption is made herein for purposes of example. However, the same concepts apply to any graphics objects or bit-mapped characters capable of being represented with a binary mask. As explained below, a mask is used to represent the pattern filled character or object during a "transparency write", which determines what data is to be modified by the pattern fill operation. This reduces read/write operations between the processor's working memory and external memory. The processor is assumed to be capable of the "transparency write".

Figure 1:
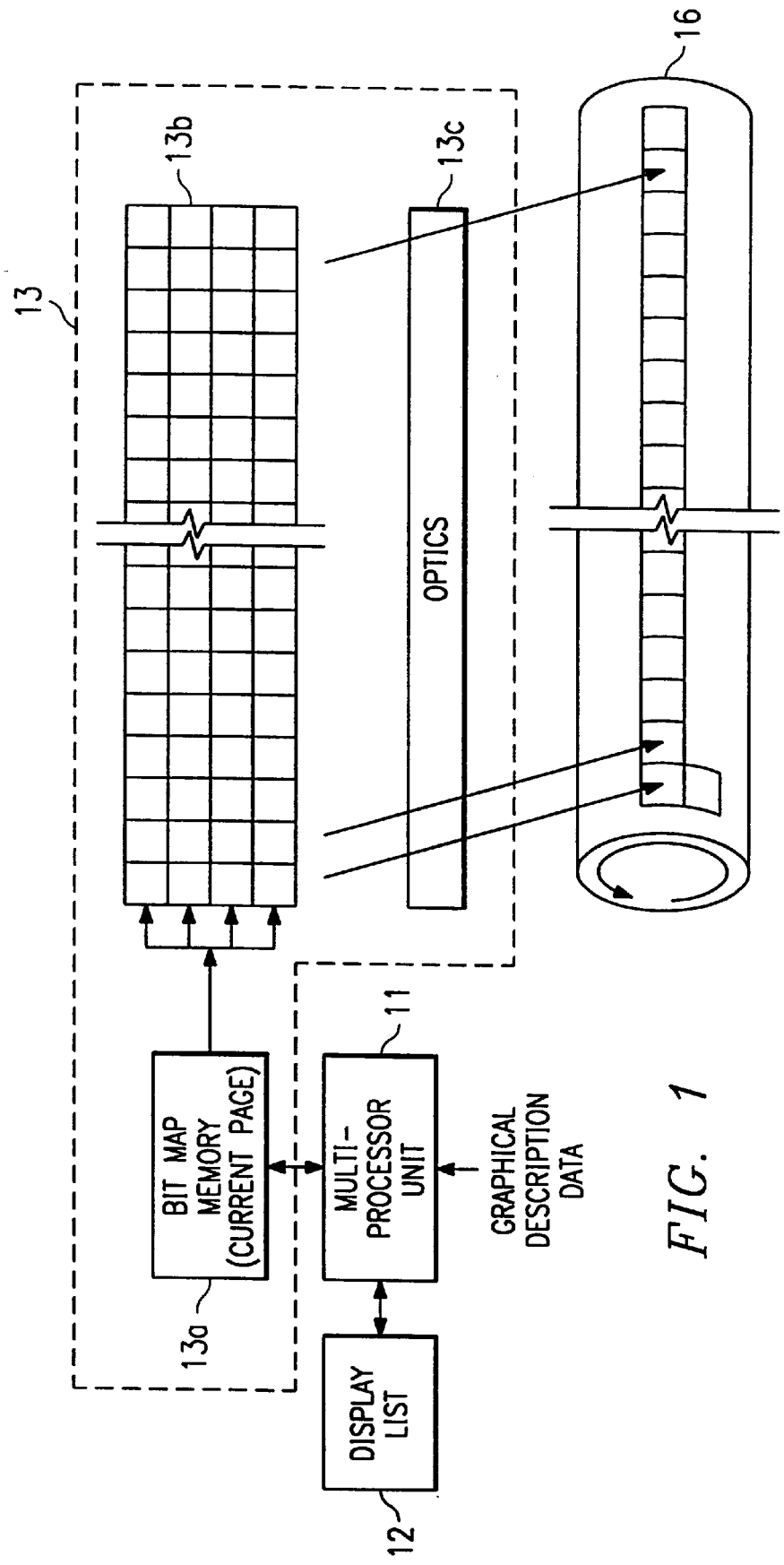
FIG. 1 illustrates portions of an electrophotographic printer, having a processor unit in accordance with the invention.

FIG. 1 illustrates portions of a printer system relevant to the invention, namely a multiprocessor unit (MPU) 11, a display list memory 12, an exposure unit 13 having a bitmap memory 13a, an SLM 13b, and optics 13c, and a photosensitive drum 16.

MPU 11 is configured and programmed in accordance with the present invention, as described below. As indicated above, MPU 11 is capable of a "transparency write", explained below in connection with FIG. 6. However, other processors, not necessarily multi processors, could be used so long as they are capable of interpreting a graphical description language consistent with the description herein and are capable of a transparency write.

As a result of interpretation of the graphical description program, MPU 11 builds an intermediate format, such as a display list. The display list is further converted into bit mapped data. The process of converting a display list to a raster bit map is also sometimes referred to as "scan conversion", a term which has been carried over to SLM-based printers even though they do not scan a beam of light. This process is also referred to as "rasterization" or "rendering" the image. The "bitmap" is the representation of the image on a pixel-by-pixel basis, and may use grayscale or color values for each pixel. The bit mapped data determines which mirrors will be on or off at any given time.

The basic structure and operation of a suitable SLM-based exposure unit 13 and drum 16 are known in the art of electrophotographic printing. In the case of an SLM, the exposure unit 13 may include hardware for converting the bit mapped data into binary exposure data. Basically, the exposure of drum 16 is accomplished with SLM 13b, which has an array of light-reflecting or light-generating elements. As stated above, in the example of this description, the SLM is a DMD, which has an array of light-reflecting micromirrors. Each micromirror is electronically controlled to tilt to an on or off position to form an image. Grayscale images are achieved by modulating the intensity, the duration, or the spot size of the exposure.

An example of a printer system, having a DMD-based exposure unit, with which the invention may be used, is described in U.S. Pat. No. 5,041,851, entitled "Spatial Light Modulator Printer and Method of Operation", to W. E. Nelson. Various methods of operating an SLM to provide grayscale images are described in U.S. Pat. No. 5,461,410, entitled "Gray Scale Printing Using Spatial Light Modulators", to J. M. Florence, et al., and in U.S. Pat. No. 5,461,411, entitled "Process and Architecture for Digital Micromirror Printer", to V.Venkateswar, et al. Each of these patents is assigned to Texas Instruments Incorporated and each is incorporated by reference herein For purposes of providing a simple example, SLM 13b is illustrated as having only 4 rows of light-reflecting micromirrors. In practical applications, SLM 13b may have more rows and will have many columns. A typical SLM 13 might have 1000 or more elements per row. Light from a light source (not shown) is reflected by SLM 13b onto drum 16, in accordance with the "on" or "off" state of each micromirror. This state is determined by data delivered from an exposure data memory 13a.

The image is reflected from SLM 13b and focused through an optics unit 13c. As shown in FIG. 1, light from SLM 13b falls onto drum 16, with each mirror providing light for one pixel on the image. Only one line of pixels is explicitly illustrated, it being understood that many lines of pixels are simultaneously illuminated by SLM 13b. Each pixel is either exposed or not, and thereby either charged or discharged for toner attraction. Two typical sizes for such pixels are 1/300 of an inch square and 1/600 of an inch square. The drum 16 will then rotate over the paper to be printed and the toner will be transferred from the drum 16 and fused to the paper, the line of pixels printing a line on the paper.

Figure 2:
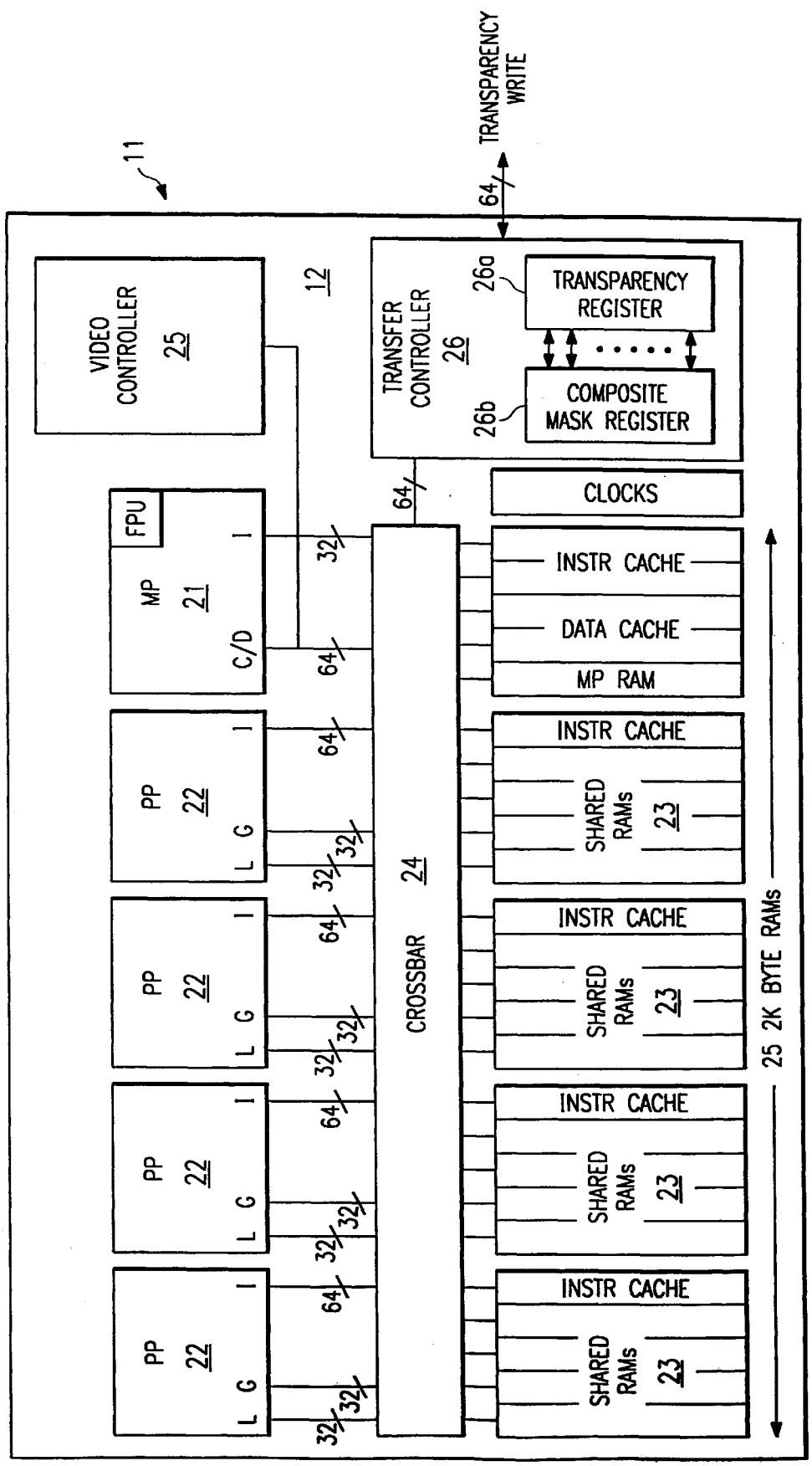
FIG. 2 illustrates the processor unit of FIG. 1.

FIG. 2 is a block diagram of MPU 11, configured for graphics processing in accordance with the invention. A suitable MPU 11 is the TMS320C80 MVP, manufactured by Texas Instruments Incorporated. Other MPUs having similar characteristics could be substituted. MPU 11 can be a single-chip device, such as is the MVP, or can be comprised of multiple components.

In addition to the structural characteristics described below, an important functional characteristic of MPU 11 is the ability to interpret a high level graphical description programming representing high-resolution full-color images at acceptable speeds. To this end, the MVP is capable of performing 2 billion RISC-like operations per second (BOPs). The internal data memory transfer bandwidth is 2.4 Gbytes per second and the external data transfer bandwidth is 400 Mbytes per second.

MPU 12 has a master processor 21, a number of parallel processors 22, and RAM (random access memory) 23. All processors 21 and 22 are programmable. The processors 21 and 22 access RAM 23 via a crossbar switch 24. The crossbar switch 24 interconnects processors 21 and 22 in a manner such that different combinations of memory arrangements can be achieved as necessary for the particular operation.

The master processor 21 is a 32-bit RISC (reduced instruction set computer) processor with a floating point hardware unit (FPU). It has an instruction (I) port to access an instruction cache in RAM 23. It coordinates the processing by the parallel processors 22 and communicates with other components of the printer.

The parallel processors 22 are 32-bit integer units. Each parallel processor 22 has a global (G) and a local (L) port to access RAM 23, and an instruction (I) port to access an instruction cache in RAM 23. Each parallel processor 22 has two address generators, a three-input ALU, and a clock multiplier, all controlled with 64-bit instructions. The parallel processors 22 use a 64-bit instruction opcode. The instruction set is described primarily as an assembly language.

Transfer controller 26 is a direct memory access device, used for cache servicing and transferring blocks of data on or off multiprocessor unit 12. A feature of transfer controller 26 is the capability for "transparency writes", where the transfer controller 26 compares two sets of data and writes only data for which the comparison is false. As explained below in connection with FIG. 6, this feature is used to implement the method of the invention.

RAM 23 is 50 Kbytes of single-cycle memory, divided into 25 2 K-byte RAM units. Each processor 21 and 22 has one RAM unit partially dedicated to storing interrupt vectors addresses and specifying parameters to the transfer controller 26. Each parallel processor 22 has three data RAM units that any processor 21 or 22 can access as shared memory. Each parallel processor 22 has one instruction cache RAM unit and the master processor 21 has two instruction cache RAM units. These RAMs are managed by an instruction cache controller in each processor. The master processor 21 also has two RAM units for data, managed by a data cache controller.

Further details describing the MVP are set out in U.S. Pat. No. 5,212,777, entitled "Multi-Processor Reconfigurable in Single Instruction Multiple Data (SIMD) and Multiple Instruction Multiple Data (MIMD) Modes and Method of Operation", assigned to Texas Instruments Incorporated. Additional information is available in various MVP User's Guides (1995), published by and available from Texas Instruments. These documents are incorporated by reference herein.

In operation, MPU 11 receives a graphics description program representing an image to be rendered. Master processor 21 is programmed to interpret the program and may share interpretation tasks with the parallel processors 22.

Consistent with the Postscript language, MPU 11 maintains a "current page" in bitmap memory 13a during the interpretation process. The current page accumulates marks made by printing operators. As each printing operator executes, marks are placed on the current page. Each mark obscures any marks it overlays.

One printing operator is the "pattern fill" operator, which fills a graphics object or a character with a repeating FIGURE rather than a solid color. A pattern fill may be "uncolored", in which case the pattern has no inherent color but rather a color is specified separately. Or, a pattern may be "colored", in which case the pattern's color is self contained.

Figure 3:
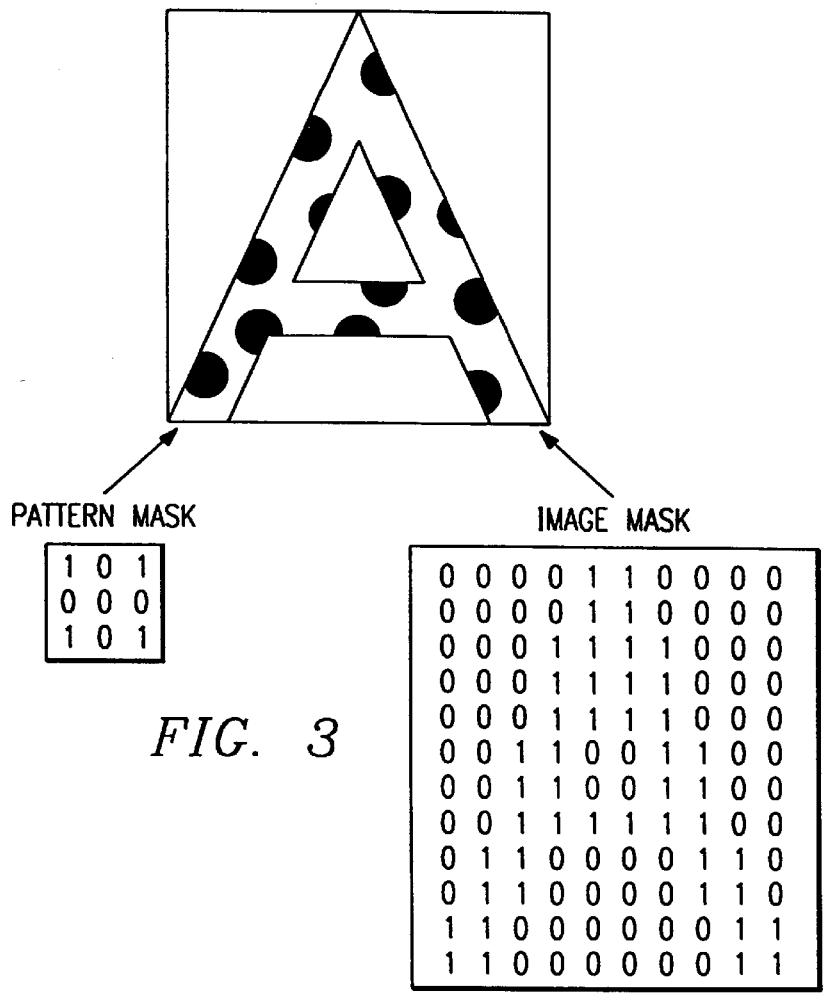
FIG. 3 illustrates a character to be pattern filled, a pattern mask, and a character mask.

FIG. 3 illustrates a character, the letter "A", filled with a pattern of dots, which is a portion of a page to be printed. In the absence of the invention, the first step of the pattern fill would be to read from memory 13a, a "source region" of the current page. This source region would contain the bitmap data (n-bits per pixel) for the character to be filled. This data would be read into working memory of the processor so that it could be modified with the pattern fill and written back out to memory 13a.

A feature of the invention is avoidance of this read of the source region. Instead, MPU 11 uses information already accessible to it to create a mask that represents the filled character. It uses this mask during a transparency write to write out only the pixels in the source region that are to be modified.

FIG. 3 further illustrates both an image mask for the character "A" and the pattern mask for the pattern of dots. Both masks are binary, in that 1's and 0's represent places on the page that should be marked with the current color or not marked. The places that are not marked retain their values in the current page. An analogy would be pouring paint through a stencil, where a cut-out piece permits paint to reach the page. Both the pattern mask and the image mask have a bounding box width and a bounding box height, which specify their width and height. The bounding box width and height are usually stated in terms of the number of pixels wide or high the mask represents.

An uncolored pattern is specified as a 1 bit per pixel mask with a color fill value. Where the mask bit is 1, the bit map pixel is set to the color value, and where it is 0 the bit map pixel is unchanged. A color pattern is specified as a 1 bit per pixel mask and corresponding color values of 8 bits per pixel. When the mask bit is a 1, the pixel is set to the corresponding color value.

Figure 4:
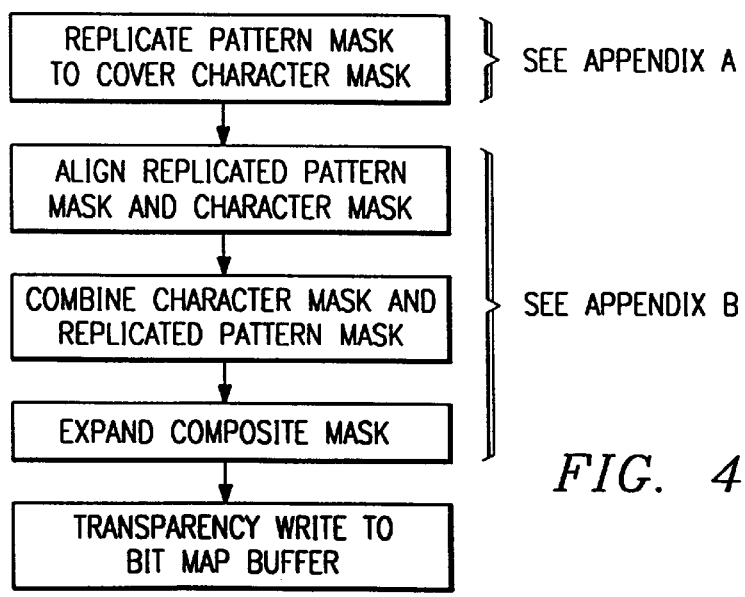
FIG. 4 illustrates the basic steps of a pattern filling process for a character.

FIG. 4 illustrates the basic steps of a pattern filling process for a character. In FIG. 4, the pattern is assumed to be uncolored. As explained below, colored pattern fills use a reserved value during a transparency write step, and may require an extra step of replacing pattern colors having this reserved value.

The pattern fill process begins by accessing the character mask and the pattern mask. Both are assumed stored in data RAMs 23, having been provided by the graphics description program as interpreted by MPU 11. It is also assumed that the color for the pattern is provided to MPU 11.

Typically, the pattern mask is smaller than the character mask, as is illustrated in FIG. 3. Thus, the next step is to replicate the pattern mask to cover the character mask. This involves writing each line of the pattern as many times as required for that pattern line to span the width of the character mask. The line writing process is repeated for as many times as required to cover the height of the character. In general, the pattern mask width is not a multiple of the memory word size. Thus, each next word in memory might begin at a different place in memory. To replicate the pattern efficiently, the replication process makes use of both a read pointer and a write pointer. The write pointer is set to each next location in memory into which a 32-bit portion of the mask is to be written. To provide the 32 bits with the correct data, the read pointer is set to a location that has already been written and that contains the next portion of the mask to be written. A shift and merge process is used to place n bits of the portion accessed by the read pointer after 32-n bits of a previous portion of the mask, thereby providing the correct 32-bits to be written into the next write location.

FIGS. 5A–5C illustrate the relationship of the memory word size to the pattern mask, and how the mask is replicated in memory. In the example of FIGS. 5A–5C, the memory width is 32 bits and the bounding box width of the pattern is 66 pixels. The character mask is wider than the pattern mask by at least two times as many pixels. The bits of the pattern mask are represented by p00, p01, . . . p65

Appendix A is an example of instructions executed by MPU 11 for replicating this pattern. These instructions are appropriate for an MVP-type MPU 11, but a similar replication program could be provided for a different graphics processor.

Referring to FIGS. 5A–5C and to Appendix A, in the first iteration, the 66-bits of the pattern are written to the first three words in memory, with the extra memory being filled with 0's. Now, the pattern needs to be replicated a first time, such that the bits after p65 begin again with p00. To this end, the write pointer is set to the next word to be written. A value containing the last word, p64, p65, . . . 000, is stored. The read pointer is set to the word containing p00, p01, . . . p29, which is the data needed to fill the next word to be written. This word is read and shifted to two bits to the right because that is the correct location for p00, p01, . . . p29 in the next word to be written. The two values are then combined to provide the correct next word, p64,p65, . . . p29. This process is repeated until the first line of the character mask is covered with the pattern. Each line of the character mask is covered in the same manner.

After the pattern mask is replicated to cover the character mask, it is aligned with the character mask. In general, it is assumed that the two masks will not have the same origin. Typically, a pattern mask is specified with its origin at the image origin, whereas the character will have a location in the image.

In the example of this description, the alignment is performed one line at a time, with each line of the pattern mask being "rotated" so that it is in the same location as the character mask. It should be understood that this "rotate" operation is a memory operation, not a graphics operation.

As an example of rotating the pattern mask, a character mask might have an origin at (0,0) of the image and have a width of 200 pixels. The pattern location might have an origin at (15,0) and have a width of 66 pixels. After the pattern mask is replicated 4 times to cover the width of the character mask, it must be rotated so that the beginning of the pattern mask corresponds to the beginning of the character mask. By analogy to a circular buffer, the last bit of the replicated pattern is placed in front of the first bit, then the next to the last bit is placed in front of the last bit, etc, until the character mask is filled by the pattern mask. In other words, bits that rotate out the right-hand side are rotated in on the left-hand side. The rotation can be to the left or to the right. In the example of this description, the last 14 bits of the replicated pattern mask would be rotated right.

Next, the character mask and the replicated and rotated pattern mask are combined to obtain a composite mask. More specifically, the two masks are AND'ed such that a 1 appears in the composite mask only where 1's appear in both masks.

The composite mask is then expanded, so that the color information is represented. A 1 in the composite mask is expanded to the color value. A 0 in the composite mask is expanded to some value that is guaranteed to be different from the color value. This value is referred to herein as the "transparency value". In the example of this description, 0's are expanded to the complement of the color value.

Appendix B is an example of programming instructions that might be used to rotate the pattern mask, combine the character and pattern masks, and expand the composite mask. These instructions correspond to steps (2)–(4) of FIG. 4. The programming instructions are consistent with programming language for an MVP-type MPU 11, but similar programming could be written for other types of graphics processors.

The expanded composite mask is transferred from the MPU 11 to the bitmap memory, using a transparency write feature of MPU 11. In general, the transparency write compares values of the expanded composite mask to the complement of the pattern fill color and writes only those that do not match.

FIG. 6 illustrates the transparency write. In this example, where pixel values are 8 bits, a 64-bit transparency value is used for 8-bit comparisons. Each 8-bit byte of the 64-bit transparency value is the complement of the color of the pattern fill. In FIG. 6, the pattern fill color is "Fg" (foreground) and its complement is ~Fg. The expanded composite mask value is 8 bytes of the expanded composite mask, each byte having either an Fg or ~Fg value, so as to indicate whether the pixels of that byte should be colored or not colored.

Before the pattern fill, the current page is comprised of pixels having either Bg (background) value or the value for the outline (i.e., K for black) of the character to be filled. During the transparency write, each byte of the transparency value is compared to the corresponding byte in the expanded composite mask value. In FIG. 6, bytes 0, 2, 4, 6, and 7 are matching. Thus, these bytes are not written out to bitmap memory 13a, leaving the corresponding values in the current page unchanged. Only bytes 1, 3, and 5 are written to the bit map memory 13a, modifying the corresponding pixels in the current page and resulting in the pattern fill. This process is repeated for all values of the expanded composite mask.

In the case of the MVP-type of MPU 11, the transfer controller 26 performs the transparency write. A transparency value register 26a stores the transparency value, and a mask register 26b stores the expanded composite mask value. If a byte of the transparency value matches a byte of the expanded composite mask, a strobe is disabled so that the data is not written. Conversely, if the values do not match, the strobe is enabled. The transparency write feature of the MVP is described in the *TMS320C80 (MVP) Transfer Controller User's Guide* (1995), published by Texas Instruments Incorporated and incorporated herein by reference.

In general, for purposes of this description, a "transparency write", is any process by which a processor compares two sets of data and writes out only that data that does or does not compare. The comparisons are of n-bit values corresponding to n-bit pixels.

Variations of the method of FIG. 4 can be used for character colored pattern fills, character solid fills, and for graphics object pattern fills both uncolored and colored. For colored pattern fills, one of the gray levels is reserved as the transparency value.

In the case of a colored pattern fill for a character, one of the grayscale values is reserved as a transparency value. When the composite mask is expanded, 1's are expanded to the pattern color for that pixel. 0's are expanded to the reserved value rather than with the complement of the pattern color. During the transparency write the comparison of the expanded composite mask data is to this reserved transparency value.

If the pattern fill has the reserved transparency value, that value in the pattern fill is replaced with the gray level nearest to the reserved value. For example, the reserved value might be Gr=255. The transparency value is Gr, Gr, . . . Gr. If the pattern fill has one or more pixels with the value Gr=255, these values are changed to Gn=254.

Appendix C sets out an example of programming instructions for replacing reserved transparency values. These instructions are specifically written for an MVP-type MPU 11. It executes them four pixels at a time in a split-ALU mode.

Graphics objects (non-characters) are rendered with their own boundaries and do not use masks. For graphics object pattern fills, the replication of the pattern mask is performed to cover the graphics object. There is no need for a combination of masks. Otherwise, the pattern fill process is the same. For colored pattern fills, the replicated pattern mask is expanded to the pattern color and its complement. For uncolored pattern fills, the replicated pattern mask is expanded to the pattern colors and a reserved transparency value.

Solid fills for characters can also be performed with a similar process. The character mask is expanded so that 1's are expanded to the fill color and 0's are expanded to the complement of that color. The transparency write compares the complement of the color to the expanded character mask and writes only those pixels that do not match.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

APPENDIX A

```
read_ptr = beginning of pattern mask buffer
write_ptr = read_ptr + Pattern mask words available/row-1
shift_amt = XStep %32
mask = 0xFFFFFFFF if shift amount ! = 0
     = 0x00000000 if shift amount = 0
first = *write_ptr
second = *read_ptr++
LOOP:
{
output = second >> u shift_amt
output = output | (mask & first)
first = second << (32 - shift_amt)
|| *write_ptr++ = output
second = *read_ptr++
}
```

APPENDIX B

```
complement = ~gray_value
outer_loop_count = ceil (character width/32)
inner_loop_count = 7
rotate_amt = X_index %32
mask = 0xFFFFFFFF if rotate amount ! = 0
     = 0x00000000 if rotate amount = 0
pattern_ptr = floor (X_index/32)
second = *pattern_ptr++
first = second << rotate_amt
|| second = *pattern_ptr++
```

-continued

```
OUTER_LOOP:
{
inter = second >> u(32-rotate_amt)
pattern_mask = first | (inter & mask)
|| font_mask & *font_ptr++
mf = font_mask & pattern_mask
output = (gray_value & @mf) | (complement & ~@mf)
INNER_LOOP:
{
output = (gray_value & @mf) | (complement & !@mf)
|| *band_ptr++ = output
first = second << rotate_amt
|| second = *pattern_ptr++
|| *band_ptr++ = output
}
```

APPENDIX C dummy = me GaGbGcGd - GrGrGrGr ;mf flags set based on equality
Ga'Gb'Gc'Gd' = GnGnGnGn & @mf + GaGbGcGd & ~@mf;
where GaGbGcGd are the 4 input pixels and Ga'Gb'Gc'Gd'
are the pixels after reserved gray level replacement.

What is claimed is:

1. A method of writing pattern fill values to a bit map memory, for printing a character represented by a character mask that is to be filled with a pattern represented by a pattern mask, comprising the steps of:

replicating said pattern mask to cover said character mask, thereby providing a replicated pattern mask;

combining said replicated pattern mask and said character mask, thereby providing a composite mask;

expanding said composite mask, such that mask values representing pixels to be printed are replaced with color values of said pattern and mask values representing pixels not to be printed are replaced with a transparency value, thereby providing an expanded composite mask;

comparing values of said expanded composite mask to a stored value equal to said transparency value; and writing only values of said expanded composite mask that do not match said stored value.

2. The method of claim 1, wherein said replicating step is performed with read and write pointers, by shifting a new value already written by said write pointer and accessed by said read pointer.

3. The method of claim 1, further comprising the step of aligning said pattern mask and said character mask.

4. The method of claim 3, wherein said aligning step is performed after said replication step.

5. The method of claim 3, wherein said aligning step is performed by rotating said pattern mask.

6. The method of claim 1, wherein said color values are for a single color and wherein said transparency value is the complement of said color values.

7. The method of claim 1, wherein said color values are for different colors and wherein said transparency value is a reserved value.

8. The method of claim 7, and further comprising the step of replacing any of said different colors that is the same as said transparency value with another color value.

9. A processing unit for a printer system, the processor being operable to write data for a pattern filled character to a bit map memory, comprising:

a processor programmed with instructions to access a character mask representing said character and a pattern mask representing said pattern; to replicate said pattern mask to cover said character mask, thereby providing a replicated pattern mask; to combine said replicated pattern mask and said character mask, thereby providing a composite mask; to expand said composite mask, such that mask values representing pixels to be printed are replaced with color values of said pattern and mask values representing pixels not to be printed are replaced with a transparency value, thereby providing an expanded composite mask; to compare values of said expanded composite mask to a stored value equal to said transparency value; and to write only values of said expanded composite mask that do not match said stored value; and memory operable to store said instructions and to store said values during execution of said instructions.

10. The processing unit of claim 9, wherein said processor has a transparency write register for storing multiple copies of said transparency value such that it may compare multiple of said values of said expanded composite mask simultaneously.

11. A method of writing pattern fill values to a bit map memory, for printing a graphics object to be filled in with a pattern represented by a pattern mask, comprising the steps of:

replicating said pattern mask to cover said graphics object, thereby providing a replicated pattern mask;

expanding said replicated mask, such that mask values representing pixels to be printed are replaced with color values of said pattern and mask values representing pixels not to be printed are replaced with a transparency value, thereby providing an expanded mask;

comparing values of said expanded mask to a stored value equal to said transparency value; and writing only values of said expanded mask that do not match said stored value.

12. The method of claim 11, wherein said replicating step is with read and write pointers, by shifting a new value already written by said write pointer and accessed by said read pointer.

13. The method of claim 11, further comprising the step of aligning said pattern mask and said character mask.

14. The method of claim 13, wherein said aligning step is performed after said replication step.

15. The method of claim 13, wherein said aligning step is performed by rotating said pattern mask.

16. The method of claim 11, wherein said color values are for a single color and wherein said transparency value is the complement of said color values.

17. The method of claim 11, wherein said color values are for different colors and wherein said transparency value is a reserved value.

18. The method of claim 11, further comprising the step of replacing any of said different colors that is the same as said transparency value with another color value.

19. A method of writing solid fill values to a bit map memory, for printing a character represented by a character mask that is to be filled with one or more fill colors, comprising the steps of:

expanding said character mask, such that mask values representing pixels to be printed are replaced with color values and mask values representing pixels not to be printed are replaced with a transparency value different from said color values, thereby providing an expanded character mask;

comparing values of said expanded character mask with a stored value equal to said transparency value; and writing only values of said expanded character mask that do not match said stored value.

* * * * *